(12) United States Patent
Deng et al.

(10) Patent No.: US 10,781,565 B2
(45) Date of Patent: Sep. 22, 2020

(54) WATER INTAKE FLOATING ROW CLEANING SYSTEM AND CONSTRUCTION METHOD THEREOF

(71) Applicant: Shenzhen Shenshui Water Resources Consulting Co., LTD., Shenzhen, Guangdong (CN)

(72) Inventors: Xuerang Deng, Guangdong (CN); Laihui Luo, Guangdong (CN); Lihan Yang, Guangdong (CN); Bo Luo, Guangdong (CN); Weibin Peng, Guangdong (CN); Fengying Zhang, Guangdong (CN)

(73) Assignee: Shenzhen Shenshui Water Resources Consulting Co., LTD., Shenzhen (CN)

( * ) Notice: Subject to any disclaimer, the term of this patent is extended or adjusted under 35 U.S.C. 154(b) by 0 days.

(21) Appl. No.: 16/449,328

(22) Filed: Jun. 21, 2019

(65) Prior Publication Data

US 2019/0368148 A1 Dec. 5, 2019

Related U.S. Application Data

(63) Continuation-in-part of application No. PCT/CN2018/117340, filed on Nov. 24, 2018.

(30) Foreign Application Priority Data

Jun. 2, 2018 (CN) .......................... 2018 1 0559953

(51) Int. Cl.
*E02B 8/02* (2006.01)
*E02B 15/08* (2006.01)
(Continued)

(52) U.S. Cl.
CPC .......... *E02B 15/0835* (2013.01); *B01D 35/05* (2013.01); *E02B 5/085* (2013.01);
(Continued)

(58) Field of Classification Search
CPC . E02B 5/08; E02B 5/085; E02B 8/023; E02B 8/026; E02B 9/04; E02B 15/0835;
(Continued)

(56) References Cited

U.S. PATENT DOCUMENTS

| | | | | |
|---|---|---|---|---|
| 2,837,211 A | * | 6/1958 | Everson | ................. E02B 8/026 210/154 |
| 5,393,418 A | * | 2/1995 | Jackson | ................. E02B 8/026 210/159 |
| 5,653,874 A | * | 8/1997 | Berry, III | ................ E02B 1/006 210/159 |
| 8,282,836 B2 | * | 10/2012 | Feher | ....................... E02B 9/04 210/170.1 |

(Continued)

FOREIGN PATENT DOCUMENTS

| CN | 200971490 Y | 11/2007 |
|---|---|---|
| CN | 204491558 U | 7/2015 |

(Continued)

*Primary Examiner* — Christopher Upton

(57) ABSTRACT

The invention relates to a water intake floating row cleaning system, including first vertical guide rail assemblies, a floating row, submersible pumps, water spraying assemblies, second vertical guide rail assemblies, floating fences and pumping assemblies, wherein the water spraying assemblies are communicated with the submersible pumps, and the submersible pumps pump the water of the river channel and spray the water towards the outside through the water spraying assemblies; and the floating fences stretch across the water intakes and float along with a water level, and the pumping assemblies are used for pumping out garbage blocked by the floating fences. The invention has the effect of efficiently cleaning the floating garbage at the water intakes.

10 Claims, 5 Drawing Sheets

(51) Int. Cl.
 *E02B 15/10* (2006.01)
 *E03B 1/02* (2006.01)
 *E02B 5/08* (2006.01)
 *B01D 35/05* (2006.01)
 *B08B 3/14* (2006.01)

(52) U.S. Cl.
 CPC ............ *E02B 8/026* (2013.01); *E02B 15/108* (2013.01); *E03B 1/02* (2013.01); *B08B 3/14* (2013.01)

(58) Field of Classification Search
 CPC ......... B08B 9/0856; E03B 1/02; E03B 1/042; E03B 3/04; B01D 35/05
 USPC .... 210/747.5, 747.6, 158, 159, 162, 170.05, 210/170.1; 405/127
 See application file for complete search history.

(56) References Cited

U.S. PATENT DOCUMENTS

| | | | |
|---|---|---|---|
| 2003/0085166 A1* | 5/2003 | Dreyer | ............... E03B 3/04 210/170.05 |
| 2012/0031848 A1 | 2/2012 | Sherman | |
| 2013/0341287 A1* | 12/2013 | Panousis | ............. E02B 5/085 210/747.6 |
| 2014/0001107 A1* | 1/2014 | Ishikawa | ............. E02B 8/023 210/155 |

FOREIGN PATENT DOCUMENTS

| | | |
|---|---|---|
| CN | 204608743 U | 9/2015 |
| CN | 105442510 A | 3/2016 |
| CN | 205296102 U | 6/2016 |
| CN | 106906811 A | 6/2017 |
| CN | 207727518 U | 8/2018 |
| CN | 108532567 A | 9/2018 |
| CN | 208501643 U | 2/2019 |

* cited by examiner

B-B

WATER INTAKE FLOATING ROW CLEANING SYSTEM AND CONSTRUCTION METHOD THEREOF

CROSS REFERENCE TO RELATED APPLICATIONS

The present application is a Continuation-in-part Application of PCT Application No. PCT/CN2018/117340 filed on Nov. 24, 2018, which claims the benefit of Chinese Patent Application No. 201810559953.X filed on Jun. 2, 2018. All the above are hereby incorporated by reference.

TECHNICAL FIELD

The invention relates to the technical field of structural design at a water intake of a river channel, in particular to a water intake floating row cleaning system and a construction method thereof.

BACKGROUND ART

At present, the urban water is basically sourced from river water, which specifically refers to that a water intake is arranged at one side of a river channel, and the water of the river channel is diverted to be taken out and purified until meeting the water use requirements and then delivered to residents.

At present, there is more or less garbage on the water surface of the river channel, and in order to filter the garbage, a filter net is generally arranged at the water intake to filter the diverted river water.

However, as time goes on, more and more garbage will be piled up at the water intake, and in order to maintain the cleanliness and diversion efficiency of the water, it is necessary to arrange additional persons to regularly clean up the garbage, and the manual cleaning way is too traditional and inefficient, which needs to be improved.

SUMMARY OF THE INVENTION

An objective I of the invention is to provide a water intake floating row cleaning system, which has the advantages of quickly and efficiently cleaning floating garbage at a water intake.

The above objective of the invention is achieved through the following technical scheme: a water intake floating row cleaning system is characterized in that pier columns are built on sides of a river channel, and a plurality of water intakes are formed between adjacent pier columns, and the water intake floating row cleaning system comprises first vertical guide rail assemblies, a floating row, submersible pumps, water spraying assemblies, second vertical guide rail assemblies, floating fences and pumping assemblies;

the first vertical guide rail assemblies are arranged on side walls of the pier columns close to the river channel, the floating row is slidably assembled onto the first vertical guide rail assemblies, the submersible pumps are fixedly assembled on the floating row and disposed underwater in the river channel, the water spraying assemblies are mounted on the floating row and communicated with the submersible pumps, the submersible pumps pump the water of the river channel and spray the water towards the outer side of the water intake through the water spraying assemblies, and the garbage accumulated at the water intakes can be pushed aside by the ejected water flow so as to be carried away by the water flow of the river channel; and the second vertical guide rail assemblies are arranged on adjacent side walls of the pier columns, the floating fences are slidably assembled onto the second vertical guide rail assemblies, the floating fences stretch across the water intakes and float along with a water level, the pumping assemblies are partially or completely mounted on the floating fences, and the pumping assemblies are used for pumping out the garbage blocked by the floating fences.

By adopting the above technical scheme and placing the floating row on the water surface, since the water surface can rise and fall, based on the sliding assembling relationship between the floating row and the first vertical guide rail assemblies, and under the action of buoyancy of water, the floating row can rise and fall along the first vertical guide rail assemblies as the water surface rises and falls, the floating row can also drive the submersible pumps and the water spraying assemblies to move up and down, in the process that the water flow of the river channel enters the water intakes, the floating garbage on the water surface can be blocked by the floating row, then the submersible pumps are started to pump the water of the river channel and spray the water towards the outer sides of the water intakes through the water spraying assemblies, the garbage accumulated at the water intakes is pushed aside by the ejected water flow so as to be carried away by the water flow of the river channel, and no manual cleaning is needed, so that a purpose of conveniently and efficiently cleaning the garbage can be achieved; after entering the water intakes along the water flow, the smaller garbage may gradually re-float on the water surface, then the garbage which is not carried away by the water flow can be secondarily blocked by the floating fences and pumped out through the pumping assemblies, thereby achieving a purpose of secondary cleaning, and acquiring cleaner water quality; and the floating fences can rise and fall together with the water level under the action of the buoyancy of water, and by virtue of the guide effect of the second vertical guide rail assemblies, the floating fences rise and fall more stably.

Further, the second vertical guide rail assemblies are specifically channel steel, and the floating fences comprise plastic fence main bodies and pulleys, the pulleys are rotatably mounted on two sides of the plastic fence main bodies, and the pulleys freely roll vertically in the channel steel.

By adopting the technical scheme, the density of the plastic fence main bodies is relatively small, and the water buoyancy is relatively large, so that the plastic fence main bodies can rise and fall along with the water level; the pulleys are matched with the channel steel, so that the rising and falling resistance of the plastic fence main bodies can be reduced; and the channel steel has a certain guide effect on the rising and falling of the plastic fence main bodies.

Further, the pumping assembly comprises a vacuumizing pump, a first air pipe and second air pipes, the vacuumizing pumps are mounted on side piers or the floating fences, the first air pipe is directly communicated with the vacuumizing pump, the second air pipes are mounted on the floating fences, and a plurality of second air pipes are provided and are communicated with the first air pipe, and bottom air inlets of the second air pipes are close to the water surface of the river channel.

By adopting the technical scheme, negative pressure is generated when the vacuumizing pump works, so that floating objects on the water surface at the water intakes are pumped out successively along the second air pipes and the first air pipe; and the first air pipe and the second air pipes can float up and down along with the floating fences, without being influenced by the rising and falling of the water level, the floating garbage can be successfully pumped out, and the floating garbage in the water intakes can be further cleaned.

Further, the floating row comprises buoys, a working platform and sliding walking members, a plurality of buoys are provided and arranged on the water surface of the river channel, the working platform is arranged on the buoys and connects all buoys into a whole, the working platform is used for the staff to walk, the sliding walking members are fixedly assembled on the buoys and/or the working platform, and the sliding walking members are slidably assembled with the first vertical guide rail assemblies.

By adopting the above technical scheme, the buoys can generate large buoyancy, thereby ensuring that the floating row floats on the water surface; the working platform can not only ensure that all buoys are connected into a whole to improve the stability of the floating row, but also can be used for the staff to stand, thereby facilitating the maintenance, inspection and other work; and the sliding walking members can be matched with the first vertical guide rail assemblies to realize the sliding assembling relationship between the floating row and the guide rail assemblies.

Further, the water spraying assembly comprises a first water pipe, second water pipes and nozzles, the first water pipe is directly communicated with the submersible pumps, the second water pipes are mounted on the buoys and/or the working platform, a plurality of second water pipes are provided and are communicated with the first water pipe, the second water pipes and the sliding walking members are respectively arranged on two opposite sides of the floating row, and the nozzles are detachably assembled at outer side ends of the second water pipes.

By adopting the above technical scheme, the submersible pumps pump the water below the water surface and pressurize the water flow, and then the water flow flows into the second water pipes along the first water pipe and is ejected out from the nozzles so as to push away the floating garbage accumulated at the water intakes, thereby achieving the cleaning purpose; and the nozzles are detachably assembled with the second water pipes, thereby facilitating the replacement of novel nozzles or cleaning of the blocked nozzles by the staff.

Further, the sliding walking member comprises a concave seat and rollers, the concave seat is hinged onto the buoys, a cross section of the concave seat is in a concave shape, and a plurality of groups of rollers are provided and are rotatably assembled on two inner side walls of the concave seat;

the first vertical guide rail assembly includes a mounting seat and a grooved rail, the mounting seat is fixed on the pier columns through a plurality of groups of anchor bolts, a cross section of the mounting seat is in an I shape, the grooved rail is fixed on the outer side of the mounting seat through a plurality of bolt groups, and a cross section of the grooved rail is in an I shape to form sliding grooves on two sides of the grooved rail; and the rollers freely roll vertically in the sliding grooves.

By adopting the above technical schemes, the mounting seat is stably fixed on the pier columns through the anchor bolts, rails are fixedly assembled onto the mounting seat through the bolt groups, so that the first vertical guide rail assemblies are firmly assembled onto the pier columns; the cross section of the mounting seat is in an I shape, thereby providing a large operating space for the staff to mount the anchor bolts and the bolt groups; the rotatable connection between the concave seat and the buoys has certain buffering effect in the case of great fluctuation of the water surface compared with the conventional rigid connection, thereby having a good protection effect for the first vertical guide rail assemblies of the sliding walking members; and meanwhile, the rollers slide in the sliding grooves and are unlikely to slip off due to the limitation of the concave seat, and the sliding friction force can be reduced through the rolling friction way, so that the floating row is smoother and more labor-saving to rise and fall.

Further, the floating row further comprises a hanging grid, a fixed bracket and a safety railing, the hanging grid is mounted on the outer peripheral edge of the working platform and is used for blocking the floating garbage on the water surface of the river channel, the fixed bracket is arranged at the bottom of the working platform and is used for mounting and fixing the submersible pumps, and the safety railing is mounted on the upper surface peripheral edge of the working platform.

By adopting the above technical scheme, the hanging grid not only has certain blocking effect for the floating garbage moving along with the water flow, but also has certain protection effect for the buoys to prevent the buoys from being damaged by the floating garbage; the fixed bracket not only can mount the submersible pumps to improve the stability of the submersible pumps, but also has certain protection effect for the submersible pumps; and when the staff walk or do the maintenance work on the working platform, the safety railing can effectively prevent the staff from falling into the water, thereby improving the safety.

Further, a blocking net is also arranged behind the floating fences, and the blocking net is used for blocking silt in the water flow in the water intakes.

By adopting the above technical scheme, the blocking net can have a good blocking effect for the silt moving along with the water flow, so that a water source obtained from the water intake has smaller silt content and clearer water quality.

Further, one end of the floating row close to the upstream of the water flow of the river channel is provided with a side stopper, and the side stopper blocks a gap between the floating row and the pier columns, and is used for blocking the garbage floating along with the water flow of the river channel.

By adopting the above technical scheme, some floating garbage may enter the gap between the floating row and the pier columns along with the water flow, and the side stopper has an effect for blocking the floating garbage, so that the garbage is unlikely to block in the gap between the floating row and the pier columns.

An objective II of the invention is to provide a construction method for producing the water intake floating row cleaning system which has the advantages of quickly and efficiently cleaning floating garbage at a water intake.

The objective II of the invention is realized through the following technical scheme: a construction method for producing the above water intake floating row cleaning system, comprising:

building at least two pier columns on sides of a river channel to form a water intake;

mounting first vertical guide rail assemblies on side walls of the pier columns adjacent to the river channel, and mounting second vertical guide rail assemblies on adjacent side walls of the pillar columns;

customizing a floating row and floating fences, slidably assembling the floating row and first vertical guide rail assemblies, and slidably assembling the floating fences and the second vertical guide rail assemblies;

mounting submersible pumps at the bottom of the floating row, and mounting water spraying assemblies on the floating row, wherein the submersible pumps pump the water of the river channel and spray the water towards the outer sides of water intakes through the water spraying assemblies, and the garbage accumulated at the water intake is pushed aside by the ejected water flow so as to be carried away by the water flow of the river channel; and partially or completely mounting pumping assemblies on the floating fences, wherein the pumping assemblies are used for pumping out the garbage blocked by the floating fences.

By adopting the above technical scheme, not only can the water intake floating row cleaning system having the above series of advantages be produced, but also the construction method is easy to implement, and the construction modification cost is low.

In conclusion, the invention has the beneficial technical effects as follows:

first, the floating row is arranged on the water surface, since the water surface can rise and fall, based on the sliding assembling relationship between the floating row and the first vertical guide rail assemblies, and under the action of buoyancy of water, the floating row can rise and fall along the first vertical guide rail assemblies as the water surface rises and falls, the floating row can also drive the submersible pumps and the water spraying assemblies to move up and down, in the process that the water flow of the river channel enters the water intakes, the floating garbage on the water surface can be blocked by the floating row, then the submersible pumps are started to pump the water of the river channel and spray the water towards the outer sides of the water intakes through the water spraying assemblies, the garbage accumulated at the water intakes is pushed aside by the ejected water flow so as to be carried away by the water flow of the river channel, and no manual cleaning is needed, so that a purpose of conveniently and efficiently cleaning the garbage can be achieved; after entering the water intakes along the water flow, the smaller garbage may gradually re-float on the water surface, then the garbage which is not carried away by the water flow can be secondarily blocked by the floating fences and pumped out through the pumping assemblies, thereby achieving a purpose of secondary cleaning, and acquiring cleaner water quality; and the floating fences can rise and fall together with the water level under the action of the buoyancy of water, and by virtue of the guide effect of the second vertical guide rail assemblies, the floating fences rise and fall more stably.

Second, the blocking net can have a good blocking effect for the silt moving along with the water flow, so that a water source obtained via the water intake has smaller silt content and clearer water quality.

Figure 1:
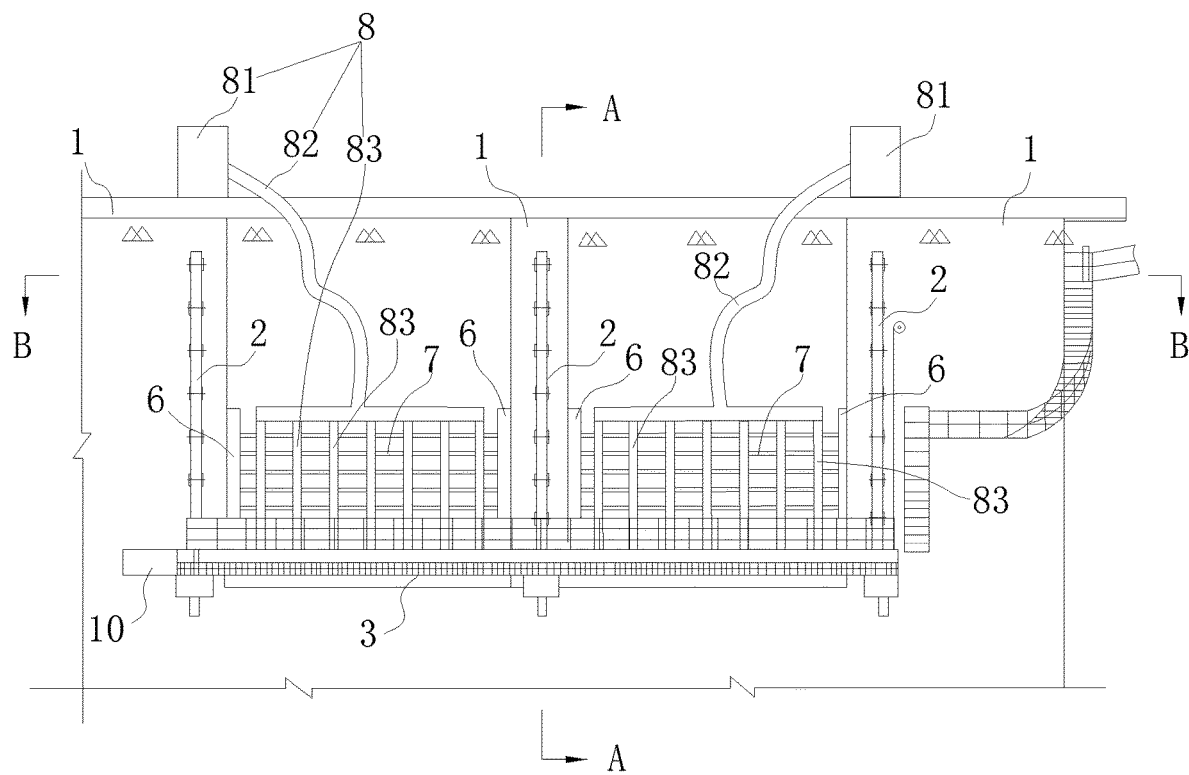
FIG. 1 is a schematic structural diagram of Example I of the invention.

Reference numerals: 1. pier column; 2. first vertical guide rail assembly; 21. mounting seat; 22. grooved rail; 3. floating row; 31. buoy; 32. working platform; 33. sliding walking member; 331. concave seat; 332. roller; 34. hanging grid; 35. fixed bracket; 36. safety railing; 4. submersible pump; 5. water spraying assembly; 51. first water pipe; 52. second water pipe; 53. nozzle; 6 second vertical guide rail assembly; 7. floating fence; 71. plastic fence main body; 72. pulley; 8. pumping assembly; 81. vacuumizing pump; 82. first air pipe; 83. second air pipe; 9. blocking net; 10. side stopper.

DETAILED DESCRIPTION OF THE INVENTION

The invention will be described in further detail below with reference to the accompanying drawings.

Example I

Figure 2:
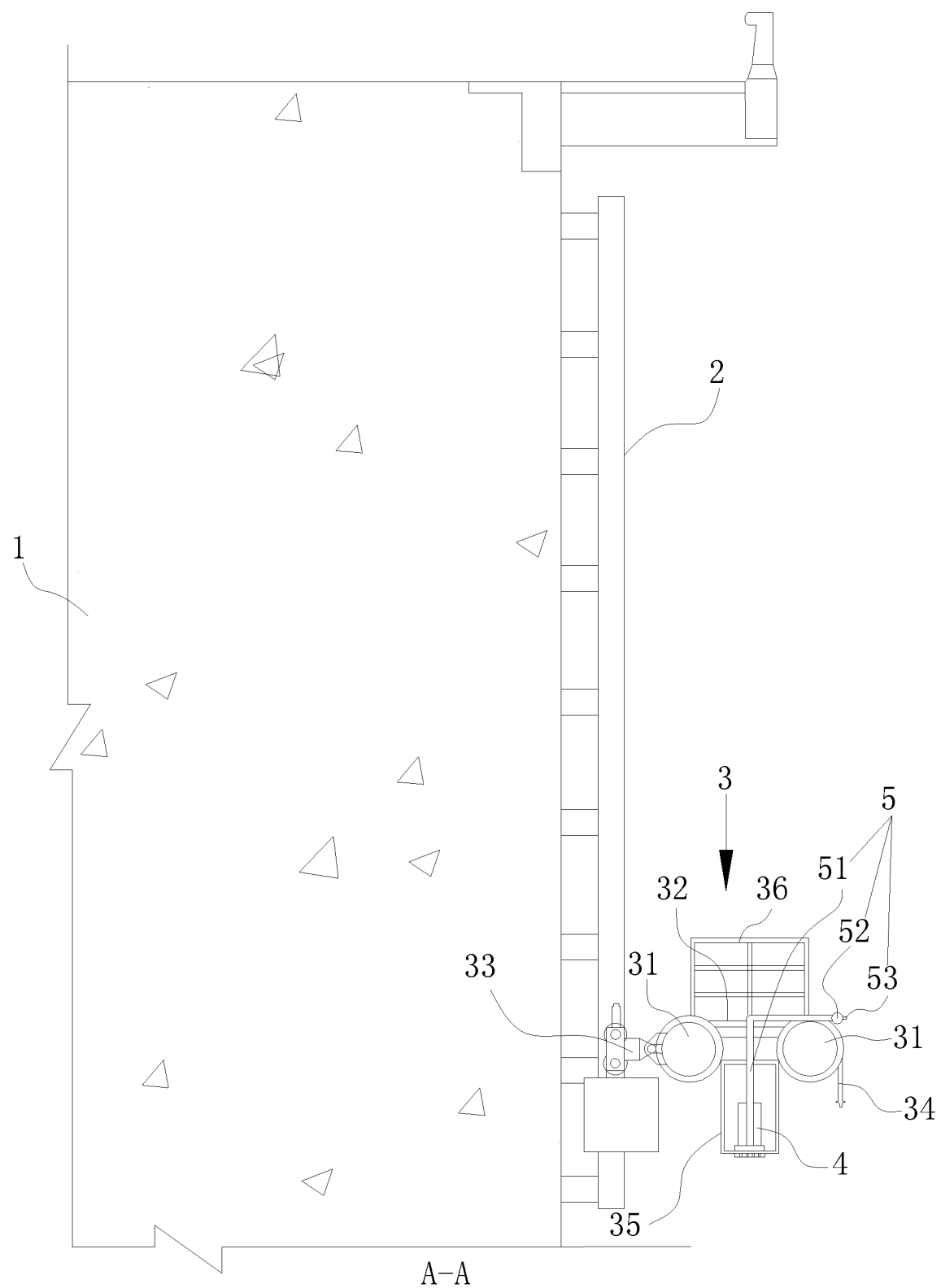
FIG. 2 is a section view of plane A-A in FIG. 1.

Referring to FIG. 1 and FIG. 2, the invention discloses a water intake floating row cleaning system; three pier columns 1 are built on sides of a river channel, and two water intakes are formed between adjacent pier columns 1 (in other embodiments, the number of the water intakes can be one or three or more pairs, and the number of pier columns 1 can be correspondingly increased or decreased); and the water intake floating row 3 cleaning system includes first vertical guide rail assemblies 2, a floating row 3, submersible pumps 4, water spraying assemblies 5, second vertical guide rail assemblies 6, floating fences 7 and pumping assemblies 8.

The first vertical guide rail assemblies 2 are arranged on side walls of the pier columns 1 close to the river channel, the floating row 3 is slidably assembled onto the first vertical guide rail assemblies 2, the submersible pumps 4 are fixedly assembled on the floating row 3 and disposed underwater in the river channel, the water spraying assemblies 5 are mounted on the floating row 3 and communicated with the submersible pumps 4, the submersible pumps 4 pump the water of the river channel and spray the water towards the outer sides of the water intakes through the water spraying assemblies 5, and the garbage accumulated at the water intakes can be pushed aside by the ejected water flow so as to be carried away by the water flow of the river channel.

The second vertical guide rail assemblies 6 are arranged on adjacent side walls of the pier columns 1, the floating fences 7 are slidably assembled onto the second vertical guide rail assemblies 6, the floating fences 7 stretch across the water intakes and float along with a water level, the pumping assemblies 8 are partially or completely mounted on the floating fences 7, and the pumping assemblies 8 are used for pumping out the garbage blocked by the floating fences 7.

The pumping assembly 8 includes a vacuumizing pump 81, a first air pipe 82 and second air pipes 83, the vacuumizing pump 81 is mounted on a side pier or floating fence 7, the first air pipe 82 is directly communicated with the vacuumizing pump 81, the second air pipes 83 are mounted on the floating fence 7, a plurality of second air pipes 83 are provided and are communicated with the first air pipe 82, bottom air inlets of the second air pipes 83 are close to a water surface of the river channel, negative pressure can be generated when the vacuumizing pump 81 works, so that floating objects on the water surface at the water intake can be pumped out successively along the second air pipes 83 and the first air pipe 82; and the first air pipe 82 and the second air pipes 83 can float up and down along with the floating fences 7, and without being influenced by the rising and falling of the water level, the floating garbage can be successfully pumped out, so that the floating garbage in the water intake can be further cleaned.

The floating row 3 includes buoys 31, a working platform 32 and a sliding walking member 33, a plurality of buoys 31 are provided and are placed on the water surface of the river channel, the working platform 32 is arranged on the buoys 31 and connects all buoys 31 into a whole, the working platform 32 is used for the staff to walk, the sliding walking member 33 is fixedly assembled on the working platform 32 (can also be mounted on the buoys 31 in other embodiments), and the sliding walking member 33 is assembled with the first vertical guide rail assemblies 2 in a sliding manner.

The buoys 31 can generate large buoyancy, thereby ensuring that the floating row 3 floats on the water surface; the working platform 32 can not only ensure that all buoys 31 are connected into a whole to improve the stability of the floating row 3, but also can be used for the staff to stand, thereby facilitating the maintenance, inspection and other work; and the sliding walking member 33 can be matched with the first vertical guide rail assemblies 2 to realize the sliding assembling relationship between the floating row 3 and the guide rail assemblies.

The floating row 3 further includes a hanging grid 34, a fixed bracket 35 and a safety railing 36, the hanging grid 34 is mounted on the outer peripheral edge of the working platform 32 and is used for blocking the floating garbage on the water surface of the river channel, the fixed bracket 35 is arranged at the bottom of the working platform 32 and is used for mounting and fixing the submersible pumps 4, and the safety railing 36 is mounted on the upper surface peripheral edge of the working platform 32.

The hanging grid 34 not only has certain blocking effect for the floating garbage moving along with the water flow, but also has certain protection effect for the buoys 31 to prevent the buoys 31 from being damaged by the floating garbage; the fixed bracket 35 not only can mount the submersible pumps 4 to improve the stability of the submersible pumps 4, but also the fixed bracket 35 has certain protection effect for the submersible pumps 4; and when the staff walk or do the maintenance work on the working platform 32, the safety railing 36 can effectively prevent the staff from falling into the water, thereby improving the safety.

The water spraying assembly 5 includes a first water pipe 51, second water pipes 52 and nozzles 53, the first water pipe 51 is directly communicated with the submersible pumps 4, the second water pipes 52 are mounted on the buoys 31 and/or the working platform 32, a plurality of second water pipes 52 are provided and are communicated with the first water pipe 51, the second water pipes 52 and the sliding walking member 33 are respectively arranged on two opposite sides of the floating row 3, and the nozzles 53 are detachably assembled at outer side ends of the second water pipes 52.

The submersible pumps 4 pump the water below the water surface and pressurize the water flow, and then the water flow flows into the second water pipes 52 along the first water pipe 51 and is ejected out from the nozzles 53 so as to push away the floating garbage accumulated at the water intakes, thereby achieving the cleaning purpose; and the nozzles 53 are detachably assembled with the second water pipes 52, thereby facilitating the replacement of novel nozzles 53 or cleaning of the blocked nozzles 53 by the staff.

One end of the floating row 3 close to the upstream of the water flow of the river channel is provided with a side stopper 10, the side stopper 10 blocks a gap between the floating row 3 and the pier column 1 and is used for blocking the garbage floating along with the water flow of the river channel, the floating garbage may enter the gap between the floating row 3 and the pier column 1 along with the water flow, and the side stopper 10 has an effect for blocking the floating garbage, so that the floating garbage is not easy to block in the gap between the floating row 3 and the pier column 1.

Figure 3:
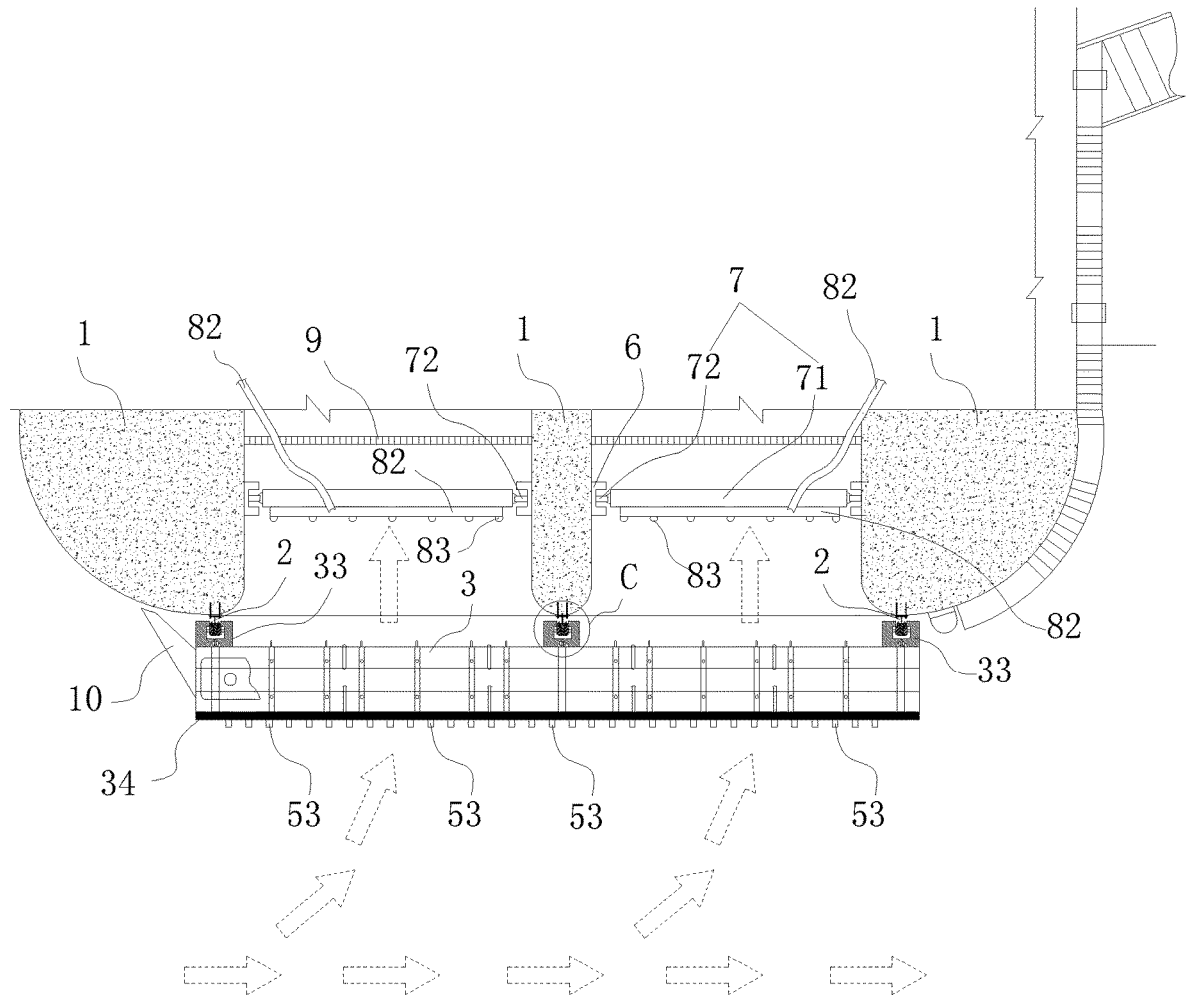
FIG. 3 is a section view of plane B-B in FIG. 1.

Referring to FIG. 1 and FIG. 3, the second vertical guide rail assembly 6 is specifically channel steel, and the floating fence 7 includes a plastic fence main body 71 and pulleys 72, the pulleys 72 are rotatably mounted on two sides of the plastic fence main body 71, and the pulleys 72 freely roll vertically in the channel steel. The density of the plastic fence main body 71 is relatively small, and the water buoyancy is relatively large, so that the plastic fence main body 71 can rise and fall along with the water level; the pulleys 72 are matched with the channel steel, so that the rising and falling resistance of the plastic fence main body 71 can be reduced; and the channel steel has a certain guide effect for the rising and falling of the plastic fence main body 71.

A blocking net 9 is further arranged behind the floating fences 7, the blocking net 9 is used for blocking silt in the water flow in the water intakes, and the blocking net 9 has a good blocking effect for the silt moving along with the water flow, so that a water source acquired via the water intake has smaller silt content and clearer water quality.

Figure 4:
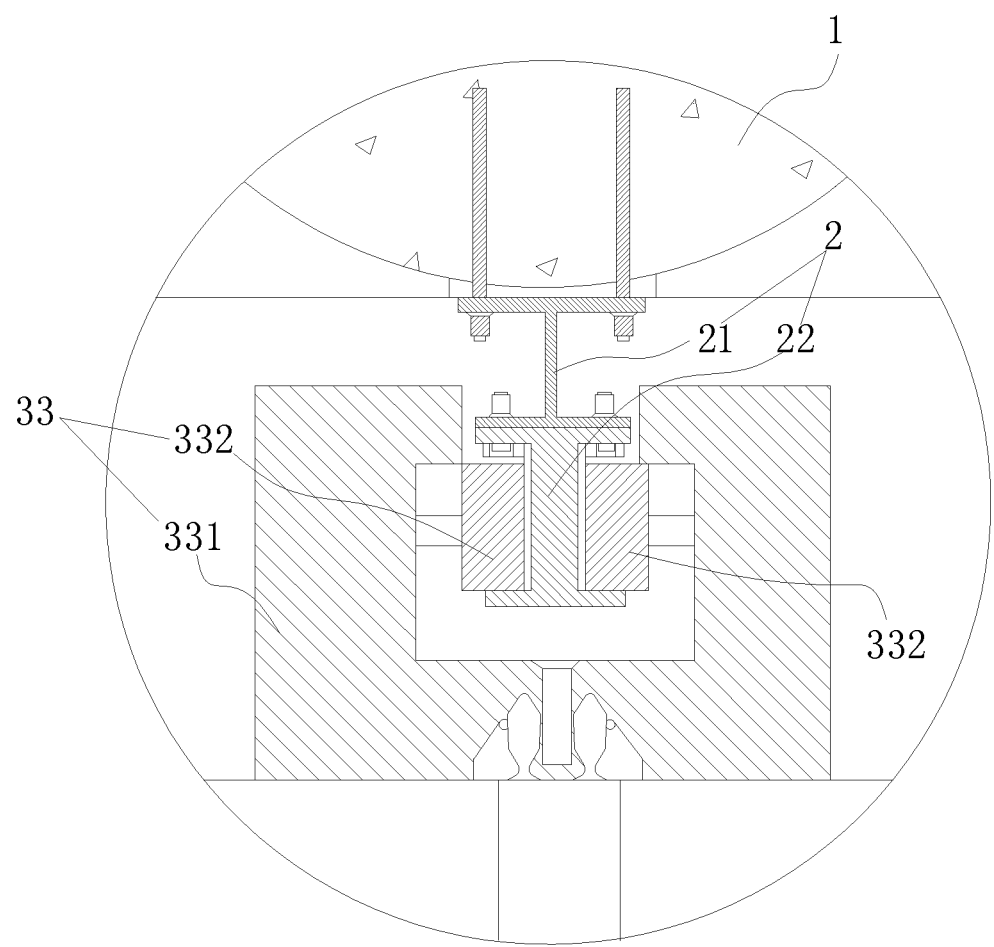
FIG. 4 is an enlarged view of C in FIG. 3.

Referring to FIG. 1 and FIG. 4, the sliding walking member 33 includes a concave seat 331 and rollers 332, the concave seat 331 is hinged onto the buoys 31, a cross section of the concave seat 331 is in a concave shape, and a plurality of groups of rollers 332 are provided and are rotatably assembled on two inner side walls of the concave seat 331; the first vertical guide rail assembly 2 include a mounting seat 21 and a grooved rail 22, the mounting seat 21 is fixed on the pier columns 1 through a plurality of groups of anchor bolts, a cross section of the mounting seat 21 is in an I shape, the grooved rail 22 is fixed on the outer side of the mounting seat 21 through a plurality of bolt groups, and a cross section of the grooved rail 22 is in an I shape to form sliding grooves on two sides of the grooved rail; and the rollers 332 freely roll vertically in the sliding grooves.

The mounting seat 21 is stably fixed on the pier columns 1 through the anchor bolts, and rails are fixedly assembled onto the mounting seat 21 through the bolt groups, so that the first vertical guide rail assembly 2 is firmly assembled onto the pier columns 1; and the cross section of the mounting seat 21 is in an I shape, thereby providing a large operating space for the staff to mount the anchor bolts and the bolt groups; and The rotatable connection between the concave seat 331 and the buoys 31 has certain buffering effect in the case of great fluctuation of the water surface compared with the conventional rigid connection, thereby having a good protection effect for the first vertical guide rail assembly 2 of the sliding walking member 33; and meanwhile, the rollers 332 slide in the sliding grooves and are unlikely to slip off due to the limitation of the concave seat 331, and the sliding friction force can be reduced through the rolling friction way, so that the floating row 3 is smoother and easier to rise and fall.

The implementation principle of the present example is as follows: the floating row 3 is placed on the water surface, since the water surface can rise and fall, based on the sliding assembling relationship between the floating row 3 and the first vertical guide rail assemblies 2, and under the action of buoyancy of water, the floating row 3 can rise and fall along the first vertical guide rail assemblies 2 as the water surface rises and falls, the floating row 3 can also drive the submersible pumps 4 and the water spraying assemblies 5 to move up and down, in the process that the water flow of the river channel enters the water intakes, the floating garbage on the water surface can be blocked by the floating row 3, then the submersible pumps 4 are started, and the submersible pumps 4 pump the water of the river channel and spray the water towards the outer sides of the water intakes through the water spraying assemblies 5, the garbage accumulated at the water intakes is pushed aside by the ejected water flow so as to be carried away by the water flow of the river channel, and no manual cleaning is needed, so that a purpose of conveniently and efficiently cleaning the garbage can be achieved; after entering the water intakes along the water flow, the smaller garbage may gradually re-float on the water surface, then the garbage which is not carried away by the water flow can be secondarily blocked by the floating fences 7 and pumped out through the pumping assemblies 8, thereby achieving a purpose of secondary cleaning, and acquiring cleaner water quality; and the floating fences 7 can rise and fall together with the water level under the action of the buoyancy of water, and by virtue of the guide effect of the second vertical guide rail assemblies 6, the floating fences 7 rise and fall more stably.

Example II

Figure 5:
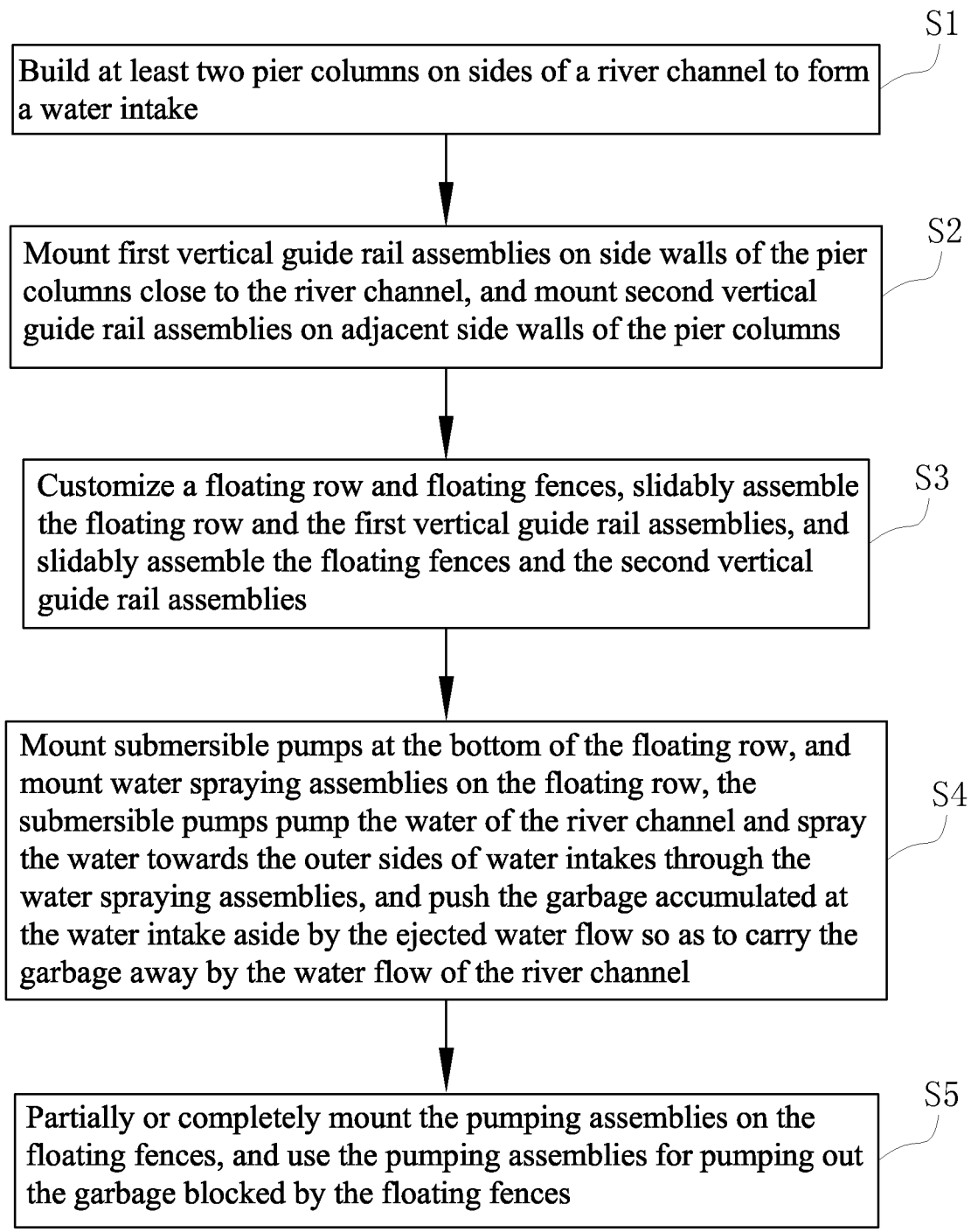
FIG. 5 is a schematic flow diagram of Example II of the invention.

Referring to FIG. 2, FIG. 3 and FIG. 5, the invention discloses a construction method for producing the water intake floating row cleaning system as described in Example I.

The construction method includes: step S1, at least two pier columns 1 are built on sides of a river channel to form a water intake; step S2, first vertical guide rail assemblies 2 are mounted side walls of the pier columns 1 close to the river channel, and second vertical guide rail assemblies 6 are mounted on adjacent side walls of the pier columns 1; step S3, a floating row 3 and floating fences 7 are customized, the floating row 3 and the first vertical guide rail assemblies 2 are slidably assembled, and the floating fences 7 and the second vertical guide rail assemblies 6 are slidably assembled; step 4, submersible pumps 4 are mounted at the bottom of the floating row 3, and water spraying assemblies 5 are mounted on the floating row 3, the submersible pumps 4 pump the water of the river channel and spray the water towards the outer sides of water intakes through the water spraying assemblies 5, and the garbage accumulated at the water intake is pushed aside by the ejected water flow so as to be carried away by the water flow of the river channel; and step S5, pumping assemblies 8 are partially or completely mounted on the floating fences 7, and the pumping assemblies 8 are used for pumping out the garbage blocked by the floating fences 7.

By adopting the above construction method, not only can the water intake floating row 3 cleaning system having the above series of advantages be produced, but also the construction method is easy to implement, and the construction modification cost is low.

The embodiments of the detailed description are all preferred embodiments of the invention, and are not intended to limit the protection scope of the invention; and therefore, all equivalent changes made in the structure, shape and principle of the invention should fall within the protection scope of the invention.

What is claimed is:

1. A water intake floating row cleaning system, characterized in that pier columns (1) are built on sides of a river channel, and a plurality of water intakes are formed between adjacent pier columns (1), the water intake floating row (3) cleaning system comprises first vertical guide rail assemblies (2), a floating row (3), submersible pumps (4), water spraying assemblies (5), second vertical guide rail assemblies (6), floating fences (7) and pumping assemblies (8);
   the first vertical guide rail assemblies (2) are arranged on side walls of the pier columns (1) close to the river channel, the floating row (3) is slidably assembled onto the first vertical guide rail assemblies (2), the submersible pumps (4) are fixedly assembled on the floating row (3) and disposed underwater in the river channel, the water spraying assemblies (5) are mounted on the floating row (3) and communicated with the submersible pumps (4), the submersible pumps (4) pump the water of the river channel and spray the water towards the outer sides of the water intakes through the water spraying assemblies (5), and garbage accumulated at the water intakes can be pushed aside by the ejected water flow so as to be carried away by the water flow of the river channel; and
   the second vertical guide rail assemblies (6) are arranged on the adjacent side walls of the pier columns (1), the floating fences (7) are slidably assembled on the second vertical guide rail assemblies (6), the floating fences (7) stretch across the water intakes and float along with a water level, the pumping assemblies (8) are partially or completely mounted on the floating fences (7), and the pumping assemblies (8) are used for pumping out the garbage blocked by the floating fences (7).

2. The water intake floating row cleaning system according to claim 1, characterized in that the second vertical guide rail assemblies (6) are specifically channel steel, and the floating fences (7) comprise plastic fence main bodies (71) and pulleys (72), the pulleys (72) are rotatably assembled at two sides of the plastic fence main bodies (71), and the pulleys (72) freely roll vertically in the channel steel.

3. The water intake floating row cleaning system according to claim 1, characterized in that the pumping assemblies (8) comprise vacuumizing pumps (81), first air pipes (82) and second air pipes (83), the vacuumizing pumps (81) are mounted on side piers or the floating fences (7), the first air pipes (82) are directly communicated with the vacuumizing pumps (81), the second air pipes (83) are mounted on the floating fences (7), and a plurality of second air pipes (83) are provided and are communicated with the first air pipes (82), and bottom air inlets of the second air pipes (83) are close to a water surface of the river channel.

4. The water intake floating row cleaning system according to claim 1, characterized in that the floating row (3) comprises buoys (31), a working platform (32) and sliding walking members (33),
   a plurality of buoys (31) are provided and arranged on the water surface of the river channel, the working platform (32) is arranged on the buoys (31) and connects all the buoys (31) into a whole, the working platform (32) is used for staff to walk, the sliding walking members (33) are fixedly assembled on the buoys (31) and/or the working platform (32), and the sliding walking members (33) are slidably assembled with the first vertical guide rail assemblies (2).

5. The water intake floating row cleaning system according to claim 4, characterized in that the water spraying assemblies (5) comprise first water pipes (51), second water pipes (52) and nozzles (53), the first water pipes (51) are directly communicated with the submersible pumps (4), the second water pipes (52) are mounted on the buoys (31) and/or the working platform (32), a plurality of second water pipes (52) are provided and are communicated with the first water pipes (51), the second water pipes (52) and the sliding walking members (33) are respectively arranged on two opposite sides of the floating row (3), and the nozzles (53) are detachably assembled at outer side ends of the second water pipes (52).

6. The water intake floating row cleaning system according to claim 4, characterized in that the sliding walking member (33) comprises a concave seat (331) and rollers (332), the concave seat (331) is hinged onto the buoys (31), a cross section of the concave seat (331) is in a concave shape, and a plurality of groups of rollers (332) are provided and are rotatably assembled on two inner side walls of the concave seat (331);

the first vertical guide rail assemblies (2) comprise mounting seats (21) and grooved rails (22), the mounting seats (21) are fixed on the pier columns (1) through a plurality of groups of anchor bolts, a cross section of the mounting seat (21) is in an I shape, the grooved rails (22) are fixed on outer sides of the mounting seats (21) through a plurality of bolt groups, and a cross section of the grooved rail (22) is in an I shape to form sliding grooves on two sides of the grooved rail; and the rollers (332) freely roll vertically in the sliding grooves.

7. The water intake floating row (3) cleaning system according to claim 4, characterized in that the floating row (3) further comprises a hanging grid (34), a fixed bracket (35) and a safety railing (36), the hanging grid (34) is mounted on an outer peripheral edge of the working platform (32) and is used for blocking floating garbage on the water surface of the river channel, the fixed bracket (35) is arranged at the bottom of the working platform (32) and is used for mounting and fixing the submersible pumps (4), and the safety railing (36) is mounted on an upper surface peripheral edge of the working platform (32).

8. The water intake floating row cleaning system according to claim 1, characterized in that a blocking net (9) is also arranged behind the floating fences (7), and the blocking net (9) is used for blocking silt in the water flow in the water intakes.

9. The water intake floating row cleaning system according to claim 1, characterized in that one end of the floating row (3) close to the upstream of the water flow of the river channel is provided with a side stopper (10), and the side stopper (10) blocks a gap between the floating row (3) and the pier columns (1), and is used for blocking garbage floating along with the water flow of the river channel.

10. A construction method, characterized by being used for producing the water intake floating row cleaning system of claim 1, the construction method comprising:

building at least two pier columns (1) on sides of a river channel to form a water intake;

mounting first vertical guide rail assemblies (2) on side walls of the pier columns (1) adjacent to the river channel, and mounting second vertical guide rail assemblies (6) on adjacent side walls of the pillar columns (1);

customizing a floating row (3) and floating fences (7), slidably assembling the floating row (3) and first vertical guide rail assemblies (2), and slidably assembling the floating fences (7) and the second vertical guide rail assemblies (6);

mounting submersible pumps (4) at the bottom of the floating row (3), and mounting water spraying assemblies (5) on the floating row (3), wherein the submersible pumps (4) pump the water of the river channel and spray the water towards outer sides of water intakes through the water spraying assemblies (5), and garbage accumulated at the water intake is pushed aside by the ejected water flow so as to be carried away by the water flow of the river channel; and partially or completely mounting pumping assemblies (8) on the floating fences (7), wherein the pumping assemblies (8) are used for pumping out the garbage blocked by the floating fences (7).

\* \* \* \* \*